Jan. 13, 1953 K. L. TREIBER 2,625,404
APPARATUS FOR LAYING HOSE LINES FROM MOVING VEHICLES
Filed Sept. 14, 1950 4 Sheets-Sheet 1
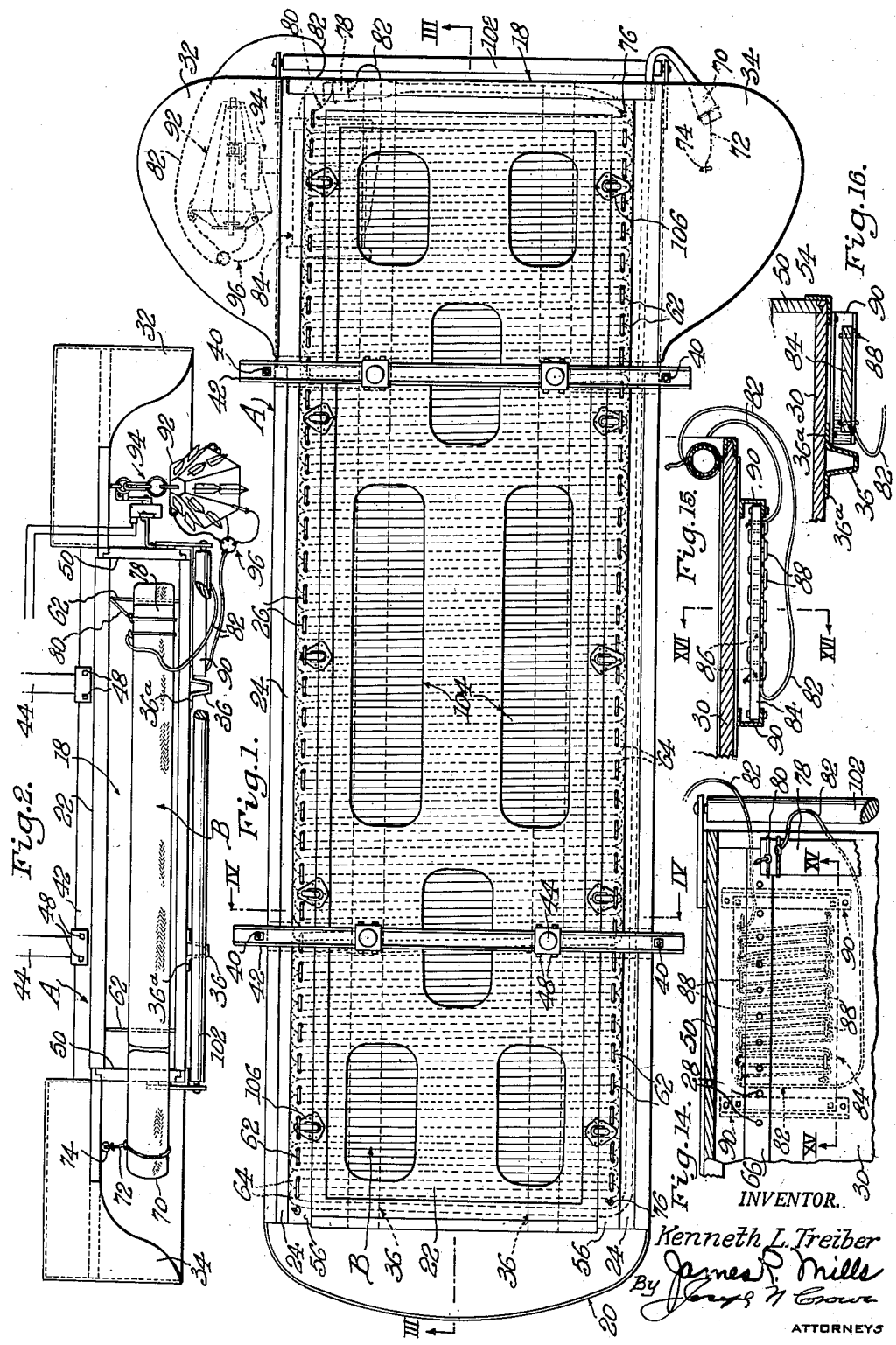
INVENTOR.
Kenneth L. Treiber
By James P. Mills
Joseph N. Crowe
ATTORNEYS

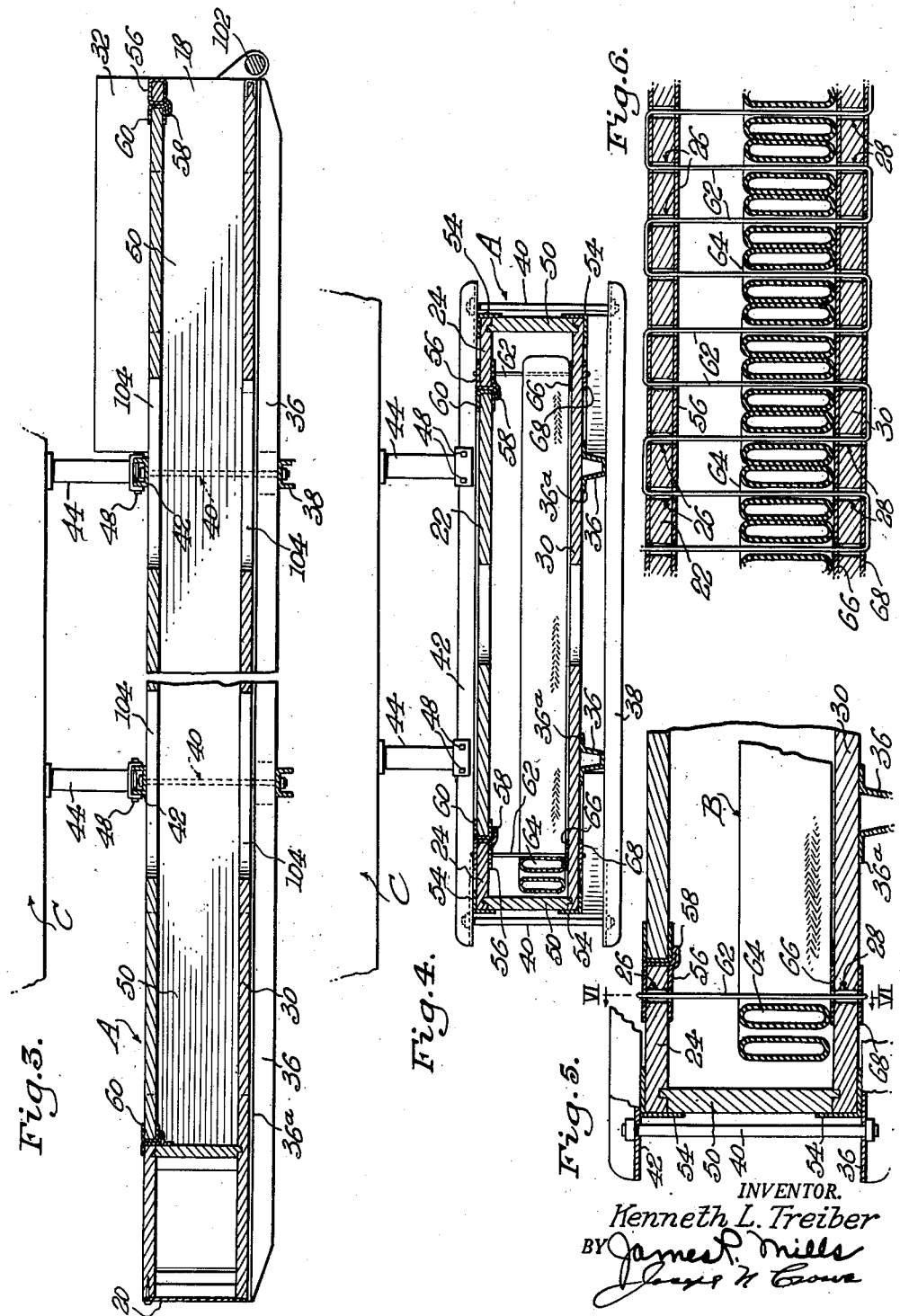

Jan. 13, 1953 K. L. TREIBER 2,625,404
APPARATUS FOR LAYING HOSE LINES FROM MOVING VEHICLES
Filed Sept. 14, 1950 4 Sheets-Sheet 3
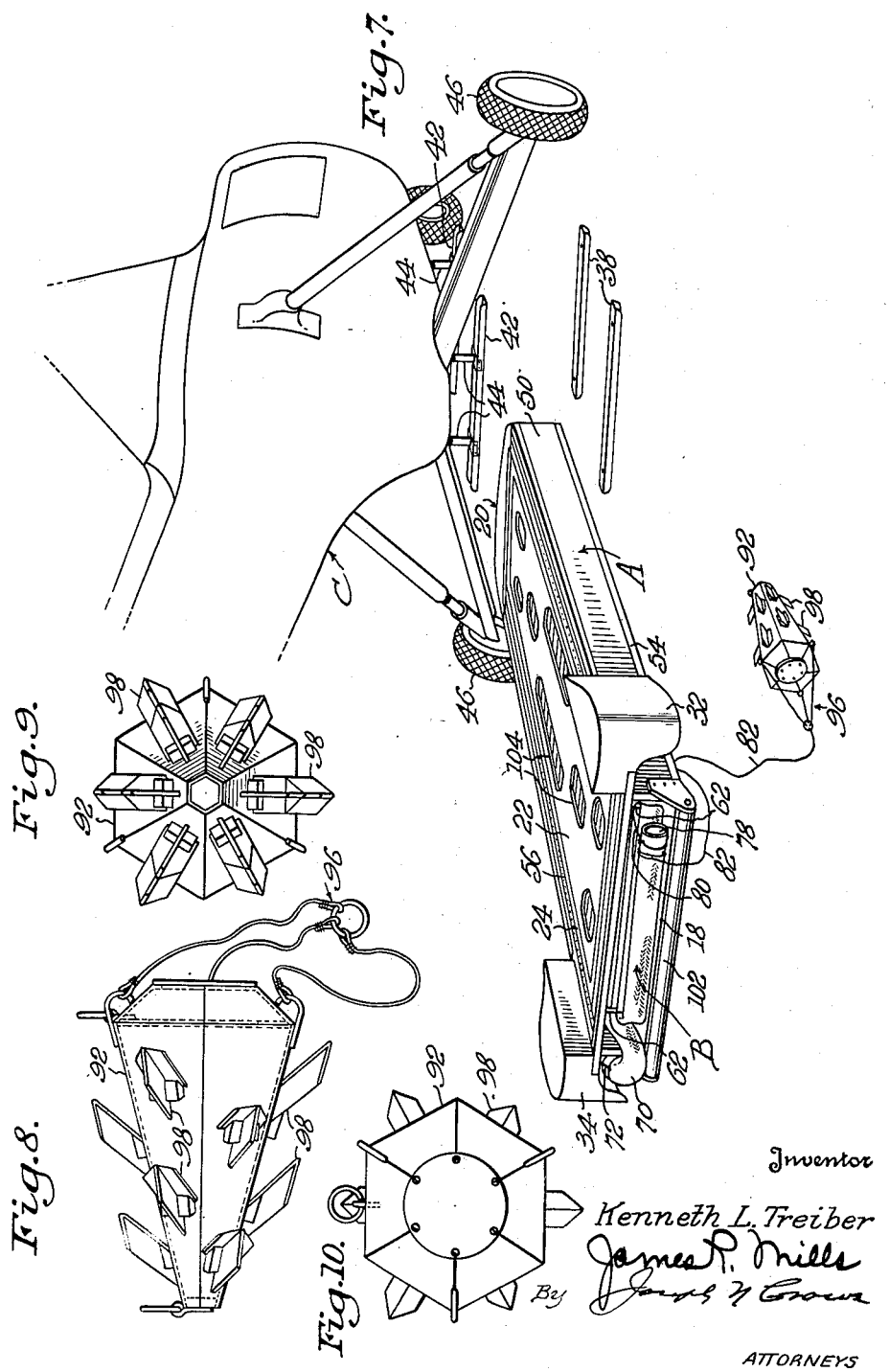
Inventor
Kenneth L. Treiber
By James P. Mills
ATTORNEYS Jan. 13, 1953 K. L. TREIBER 2,625,404
APPARATUS FOR LAYING HOSE LINES FROM MOVING VEHICLES
Filed Sept. 14, 1950 4 Sheets-Sheet 4
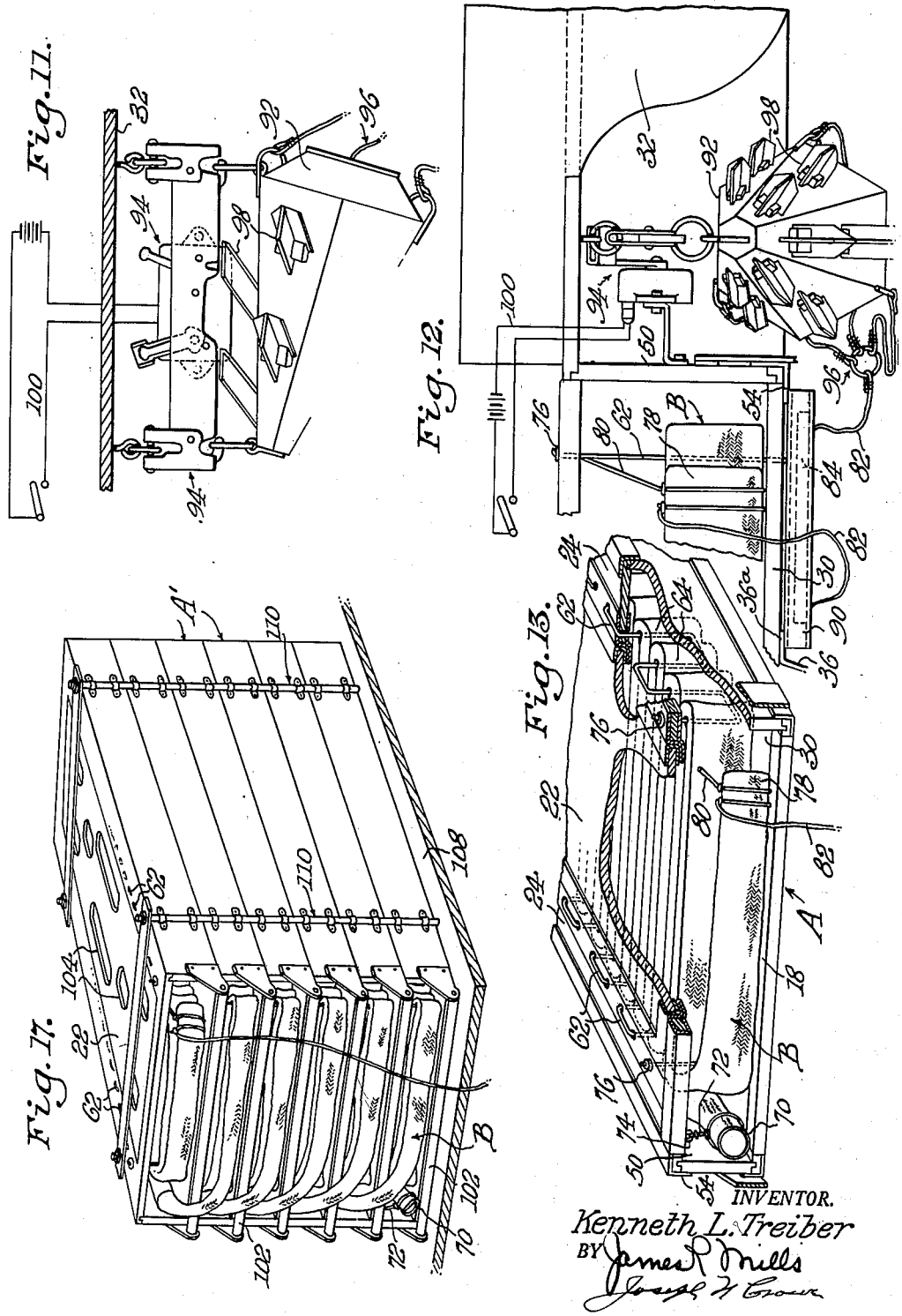
INVENTOR.
Kenneth L. Treiber
BY James R. Mills
Joseph N. Crouse
ATTORNEYS Patented Jan. 13, 1953

2,625,404

UNITED STATES PATENT OFFICE 2,625,404

APPARATUS FOR LAYING HOSE LINES FROM MOVING VEHICLES

Kenneth L. Treiber, Alexandria, Va.

Application September 14, 1950, Serial No. 184,892

5 Claims. (Cl. 280—4)

(Granted under Title 35, U. S. Code (1952), sec. 266)

The invention described herein may be manufactured and used by or for the Government for governmental purposes, without payment to me of any royalty thereon.

The present invention provides improved means for rapidly laying and retrieving flexible pipe lines for emergency handling of water, oils, chemicals, liquid fuels, and the like, particularly in connection with fast-moving vehicles such as airplanes, for example, or fast-moving trucks or other vehicles; and more particularly the invention relates to the rapid laying and retrieving of flexible hose lines of indefinitely long lengths independently of the contour of any terrain on which the hose line is to be laid.

The invention will be described particularly in connection with the laying of the hose lines from airplanes by way of illustration of the primary adaptation of the invention, although it will be understood, as has been indicated above, that the invention is not necessarily so limited but is adapted for use in connection with other types of vehicles such as trucks or similar vehicles susceptible to rapid movement and maneuvering.

In the light of such concept, it may be said that generally speaking, the invention has for one of its objects the provision of improved packaging instrumentalities for storage, transport, and paying out of lengths of flexible, collapsible hose of indefinitely long lengths, from which instrumentalities the hose will be payed out in automatically extended condition, free from kinks or other obstructions.

A further object of the invention is to provide instrumentalities of the above-indicated character in which the hose is stored and transported in successive convolutions which are retained in such instrumentalities in a condition such that each convolution is automatically released from the instrumentalities in extended position responsively to travel of the carrying vehicle over the terrain receiving the hose line.

A still further object of the invention is to provide improved anchoring instrumentalities for anchoring the free end of the hose line in the terrain on which the hose line is being laid for enabling paying out of the hose line from the succeeding convolutions thereof, so that the hose line will be laid in automatically extended, and open position free from kinks, twists, or other deformities.

A still further object of the invention is to provide improved readily frangible securing means for restraining the successive convolutions properly in the hose line container, which securing means become automatically and successively ruptured incident to the paying out of the hose line from the containing means therefor.

A still further object of the invention is to provide an improved container construction for receiving folded convolutions of collapsed flexible hose lines, which enable the said hose lines to be flatly folded and smoothly released with a minimum of friction between the hose line and container incident to the release thereof.

Further objects and advantages of the invention will become apparent as the description proceeds, and the features of novelty will be pointed out in particularity in the appended claims.

The invention will be understood more readily by reference to the accompanying drawings, in which Fig. 1 is a plan view of a hose line container embracing features of the present invention, anchoring instrumentalities and portions of the folded and collapsed hose being indicated in dotted lines;

Fig. 2 is an end elevation of the assembly of Fig. 1, the view looking towards the left in Fig. 1;

Fig. 3 is a longitudinal vertical section through the container, the view being on the line III—III of Fig. 1, looking in the direction of the arrows, the hose being omitted;

Fig. 4 is a transverse sectional elevation, taken on the line IV—IV of Fig. 1, looking in the direction of the arrows;

Fig. 5 is an enlarged fragmentary transverse sectional elevation of the left hand portion of the assembly shown in Fig. 4, the view being on an enlarged scale to show more clearly certain structural details of the assembly of Fig. 4;

Fig. 6 is a sectional view taken on the line VI—VI of Fig. 5, looking in the direction of the arrows, the view showing a series of convolutions of the hose and means for securing the hose in place which permit release of the said convolutions for paying out the hose;

Fig. 7 is a perspective view showing the attachment of the container and hose to an airplane;

Fig. 8 represents a side elevation of an anchoring device employed in conjunction with the hose, in accordance with the present invention;

Fig. 9 is an end elevation of the anchoring device shown in Fig. 8, the view looking from left to right as observed in Fig. 8;

Fig. 10 is an end elevation of the anchoring device of Fig. 8, the view showing the opposite end to that of Fig. 9, looking from right to left as viewed in Fig. 8;

Fig. 11 is a fragmentary enlarged view of one corner of the improved mechanism, the view showing diagrammatically release mechanism for the anchoring device of Fig. 8;

Fig. 12 is an end elevation of the structure shown on the right hand end of Fig. 2, the view being on an enlarged scale;

Fig. 13 is a fragmentary sectional perspective of the container with hose therein, showing details of a manner of folding and securing the hose, the view showing an enlargement of the right hand portion of Fig. 1 but omitting the lateral housings and anchoring means of Fig. 1;

Fig. 14 is a fragmentary, enlarged plan view of the upper right hand corner portion of the construction as viewed in Fig. 1;

Fig. 15 is a longitudinal vertical sectional view taken on the line XV—XV of Fig. 14;

Fig. 16 is a transverse vertical sectional view taken on the line XVI—XVI of Fig. 15, looking in the direction of the arrows;

Fig. 17 shows a perspective view of a modified form of construction adapted to accommodate a still longer length of hose composed of a series of interconnected sections or lengths of hose to form an indefinitely long length of hose which is housed in a plurality of separable units each constructed substantially as shown in Fig. 13.

Referring more particularly to the drawings, a preferred embodiment of the improved construction is illustrated in Figs. 1 through 16. In these views A represents a suitable container or box for receiving flatly folded convolutions of a flexible hose B, which is adapted and intended to be laid as a temporary or emergency pipeline from a suitable truck or other vehicle, such as an airborne vehicle C.

This box A has an open rear end 18 through which the hose is discharged by movement of the vehicle C, and has also a closed, rounded front end 20, which is designed to reduce friction of air resistance against the box A. The box A is provided with a hinged or otherwise openable cover 22, which fits between top lateral flanges 24, these latter being provided with a plurality of spaced holes 26 that are aligned with similar holes 28 disposed along the sides of the bottom 30 of the box A.

At each corner of the open rear end 18 of the box A is a hollow corner housing 32, 34 functioning as will be pointed out hereinafter. The box A is equipped with spaced, parallel, longitudinally extending skid channels 36 having laterally extending attaching flanges 36a, and spaced transversely extending channels 38 that are positioned beneath the channels 36, and which are joined by means of tie-bolts 40 to corresponding parallel channel members 42 that are carried by standards 44 depending from the underside of the body of the vehicle C intermediate the traction wheels 46 of the vehicle. The channel members 42 are secured permanently to the vehicle C by means of bolts or equivalent fasteners 48.

The box A is secured removably to these channels 42 by removable bottom channels 38 and bolts 40 or equivalent means, so that the box A may be attached to and detached from the vehicle. The box A is completed by side members or side walls 50, which are shown as being dovetailed at the top flanges 24. Longitudinally extending metallic corner angles 54 reinforce the junctures of the sides 50 with the bottom 30 and top flanges 24 of the box A.

The inner surfaces of the top flanges 24 are reinforced by metallic channel members 56, the lower corners of which are crimped outwardly as indicated at 58 to form a seat for the top 22. The channel members 56, extending longitudinally the entire length of the flanges 24, engage the longitudinally extending lateral channels 60 on the cover 22, and are provided with holes corresponding to and registering with the holes 26, and these are aligned vertically with the bottom holes 28, for permitting continuous threading of retaining cords 62 which pass between adjacent loops 64 of the hose B. These cords 62 are stitched through the top holes 26 and bottom holes 28, the holes 28 being reinforced by the edges of corresponding holes in the metal strips 66, 68 on each side of the bottom 30 of the box. The cords 62, while securing the hose in place in the box and restraining the hose from slipping bodily from the box A, nevertheless are readily frangible and become broken successively as the hose is discharged fold by fold from the open end 18 of the box. A free end 70 of the hose B is held anchored in end housing 34 by a frangible cord 72 that is tied to an eye 74 suitably mounted in the top of the housing. The hose B extends along the near side of the box A interiorly thereof from the open end 18 of the box A to the closed end 20 thence across to the opposite side of the box A. It then is packed by folding it flatly back and forth upon itself in pleated fashion as shown, the cords 62 being inserted between the end loops for securing the hose to the top and bottom of the box. The frangible cords 62 may be made of short fiber cotton having a breaking strength of about thirteen pounds, for example, this being subject to wide variation, however, depending upon the diameter, length and weight of the hose, it being required that the cords 62 normally retain the hose in place but are progressively fracturable as the folds of the hose become progressively launched. Prior to packing the hose in the box A, it may be desirable to exhaust the contained air therefrom by the use of a vacuum pump, particularly where the length of hose is substantial. Thus, also, by way of illustrative example only, if the dimensions of the box A be 4 ft. x 12 ft., for instance, and 400 ft. of 3-inch diameter hose is to be packed therein, unless the hose is first exhausted, it is almost impossible to pack the same, as entrapped air makes such hose extremely difficult to handle. The cords 62 are restrained in any suitable manner against accidental displacement from the holes through which they are threaded by knotting the free ends thereof as indicated at 76, the resulting knots being larger than the diameter of the holes, thereby preventing the cords 62 from being pulled out from the holes.

The other free end 78 of the hose B is held in place by another frangible cord 80, and a second, but non-frangible cord 82 is attached thereto, this cord 82 being in the nature of an anchoring cable, this cable 82 being of substantial length and being packed in flat folds similar to folds of the hose but beneath a perforated plate or board 84 having rows of perforations 86 therein, the folds of the cable 82 being retained by loops of frangible cords 88 through the perforations 86 in the plate or board 84. The board 84 is held in channel members 90 mounted on the underside of the bottom 30 of the box A by riveting or welding the channel members 90 to a lateral flange 36a of one of the longitudinally extending skid channels 36 and to a side of the adjacent bottom angle 54.

The free end of the cable 82 is attached to a heavy anchor weight 92 which is housed in the corner housing 32, and releasably suspended therein from magnetically releasable instrumentalities indicated generally at 94 which are similar in construction and operation to a conventional form of magnetically controlled bomb release mechanism. The anchor weight 92 is attached to the cable 82 through a bridle 96 and has a plurality of anchoring lugs or fins 98 welded or otherwise secured suitably to the housing of the anchor weight. It is not necessary to illustrate details of the magnetically operated release instrumentalities, actuation of which is effected through an electrical circuit 100. The anchor 92 may be either a solid weight, or it may be a hollow housing adapted to contain a substantial quantity of water or other weighting material for increasing the weight thereof.

In the operation of this illustrated embodiment of the improved construction, where the vehicle C is an airborne vehicle, such as an airplane or helicopter having the box A attached thereto beneath the undercarriage of the vehicle, there is involved first the release of the anchor weight 92. This pays out the cable 82, causing progressive rupture of the loops of the frangible cord 80, thereby progressively releasing the turns or convolutions of cable 82 until the end 78 of the hose B is released. The flight of the vehicle causes the folds of the hose B to be payed out successively through the open end 18 of the box A as the loops of the frangible cords 62 successively break, the hose being laid in extended position on the earth, or on trees or bushes as the case may be, as will be apparent, the hose being payed out over a guide roller 102 mounted adjacent to the open end 18 of the box A, which roller acts as an antifriction guide roller for the hose over which the hose passes as it becomes discharged. The hose is unwound from its folds progressively as the cords 62 break until the last end 70 of the hose is freed by rupture of the final frangible cord 72, the hose then being discharged completely from the box A in desired location when this end 70 clears the box A.

Instead of an airborne vehicle, the hose-laying equipment may be mounted on a traction vehicle such as a conventional truck, or similar vehicle. For such an adaptation, the modification shown in Fig. 17 is suitable. This form shows a plurality of boxes A', each of which is similar to the box A illustrated on Fig. 13, and each of which contains the desired length of hose, in which, however, the lead end of one section is attached to the tail end of the hose in the next succeeding box A'. The completely assembled hose is discharged in the same manner as described above, and each section is retained in its respective box in the same manner as described above, by frangible cords 62 which rupture under the pull of the hose being discharged, these cords securing the hose to the individual boxes as described above. The assembled boxes A' may be secured to the bottom 108 of the truck by the provision of suitable clamping means 110.

In the various forms of the assembly shown, the cover 22 may be provided with cut-out portions 104 for reducing the weight of the assembly, and the cover is held releasably in position by suitable releasable clips 106. The boxes A, or A', may be made of any suitable light material, such as light metal (e. g., aluminum alloys) or ply wood, or any other suitable lightweight material of requisite strength and rigidity to sustain the weight of the hose and strains and wear imparted to the boxes incident to the discharge of the hose therefrom.

Having thus described my invention, what I claim as new and wish to secure by Letters Patent is:

1. Apparatus for laying hose lines from moving vehicles, which comprises, in combination, a boxlike container mounted on a vehicle and adapted to contain a given length of hose flatly folded in convolutions upon itself, the said container having an opening in one end for guiding the hose during laying thereof responsively to movement of the vehicle, aligned top and bottom openings in the container, frangible securing means passing through the openings and the convolutions of the hose for releasably securing the hose to the top and bottom of the container, the said frangible means fracturing through the length thereof for progressively releasing each successive convolution of the hose through the open end of the container until the hose is discharged from the container in an approximately straight line following the course of movement of the vehicle, and means for securing the container to the vehicle.

2. Apparatus for laying hose lines from moving vehicles, which comprises, in combination, a boxlike container mounted on a vehicle and adapted to contain a length of hose flatly folded in convolutions upon itself, the said container having an opening in one end for guiding the hose during laying thereof responsively to movement of the vehicle, aligned top and bottom openings in the container, frangible securing means passing through the openings and between the convolutions of the hose for releasably securing the hose to the top and bottom of the container and preventing mass discharge of the hose from the container, the said frangible means progressively fracturing through the length thereof responsively to discharge of the hose for progressively releasing each successive convolution of the hose through the open end of the container in an approximately straight line following the course of movement of the vehicle, an anchor weight secured to the starting end of the hose, and means on the container for housing the anchor weight.

3. Apparatus for laying hose lines from moving vehicles, which comprises, in combination, a boxlike container mounted on a vehicle and adapted to contain a length of hose therein flatly folded in convolutions upon itself, the said container having an opening in one end for guiding the hose during discharge thereof from the container responsively to movement of the vehicle, aligned top and bottom openings in the container, frangible cord securing means passing through the openings and passing between successive convolutions of the hose for releasably securing the hose to the top and bottom of the container and preventing mass discharge of the hose from the container, the said frangible cord means progressively fracturing through the length thereof responsively to discharge of the hose for progressively releasing each successive convolution of the hose through the open end of the container in an approximately straight line following the course of movement of the vehicle, an anchor weight secured to the starting end of the hose, means for releasably securing the weight, and means on the container for housing the weight.

4. Apparatus for laying hose lines from moving vehicles, which comprises, in combination, a box-like container mounted on a vehicle and adapted to contain a length of hose flatly folded in convolutions upon itself, the said container having an opening in one end for guiding the hose during discharge thereof from the container responsively to movement of the vehicle, aligned top and bottom openings in the container, frangible cord-securing means passing through the openings and between the successive convolutions of the hose for releasably securing the hose to the top and bottom of the container and preventing mass discharge of the hose from the container, the said frangible cord means progressively fracturing through the length thereof responsively to progressive discharge of the hose for progressively releasing each successive convolution of the hose through the open end of the container in an approximately straight line following the course of movement of the vehicle, an anchor weight for the starting end of the hose, a non-frangible cable connecting the anchor weight to the starting end of the hose, additional mounting means for the cable including frangible cord loops supporting and securing the said non-frangible cable, a housing for the anchor weight, and means in the housing releasably securing the anchor weight in the housing, while being adapted to launch the weight into space responsively to release thereof.

5. Apparatus for laying hose lines from moving vehicles, which comprises, in combination, a box-like container mounted on a vehicle and adapted to contain a length of hose flatly folded in convolutions upon itself, the said container having an opening in one end for guiding the hose during discharge thereof from the container responsively to movement of the vehicle, aligned top and bottom openings in the container, frangible cord-securing means passing through the openings and between the successive convolutions of the hose for releasably securing the hose to the top and bottom of the container and preventing mass discharge of the hose from the container, the resulting restraining lengths of the frangible cord means progressively fracturing through the length thereof responsive to progressive discharge of the said hose for progressively releasing each successive convolution of the hose through the open end of the container in an approximately straight line following the course of movement of the vehicle, an anchor weight for the starting end of the hose, a non-frangible cable connecting the anchor weight to the starting end of the hose, additional mounting means for the cable carried in the container adjacent to the open end thereof, a second frangible cord for securing the cable in place on its mounting means, a housing for the anchor weight, means in the housing releasably securing the anchor weight in the housing while being adapted to launch the weight into space responsively to release thereof, a second housing on the container similar to the anchor housing for receiving the tail end of the hose, and means for releasably securing the tail end of the hose in the second housing.

KENNETH L. TREIBER.

REFERENCES CITED

The following references are of record in the file of this patent:

UNITED STATES PATENTS

| Number | Name | Date |
|---|---|---|
| 2,138,970 | Jones | Dec. 6, 1938 |
| 2,436,402 | Potter | Feb. 24, 1948 |
| 2,490,837 | Scott | Dec. 13, 1949 |